United States Patent
Naito

(10) Patent No.: US 9,478,360 B2
(45) Date of Patent: Oct. 25, 2016

(54) TUNGSTEN CAPACITOR ANODE AND PROCESS FOR PRODUCTION THEREOF

(75) Inventor: Kazumi Naito, Tokyo (JP)

(73) Assignee: SHOW A DENKO K.K., Tokyo (JP)

(*) Notice: Subject to any disclaimer, the term of this patent is extended or adjusted under 35 U.S.C. 154(b) by 192 days.

(21) Appl. No.: 14/366,577

(22) PCT Filed: Aug. 30, 2012

(86) PCT No.: PCT/JP2012/071941
§ 371 (c)(1),
(2), (4) Date: Jun. 18, 2014

(87) PCT Pub. No.: WO2013/094252
PCT Pub. Date: Jun. 27, 2013

(65) Prior Publication Data
US 2014/0355178 A1 Dec. 4, 2014

(30) Foreign Application Priority Data
Dec. 19, 2011 (JP) .................................. 2011-276857

(51) Int. Cl.
| | | |
|---|---|---|
| *H01G 9/052* | (2006.01) | |
| *C22C 27/04* | (2006.01) | |
| *B22F 3/12* | (2006.01) | |
| *H01G 9/00* | (2006.01) | |
| *H01G 9/042* | (2006.01) | |
| *B22F 3/11* | (2006.01) | |
| *H01G 9/15* | (2006.01) | |

(52) U.S. Cl.
CPC ................. *H01G 9/052* (2013.01); *B22F 3/11* (2013.01); *B22F 3/12* (2013.01); *C22C 27/04* (2013.01); *H01G 9/0029* (2013.01); *H01G 9/042* (2013.01); *H01G 9/0525* (2013.01); *B22F 2998/10* (2013.01); *H01G 9/15* (2013.01)

(58) Field of Classification Search
CPC .... H01G 9/052; H01G 9/042; H01G 9/0029; H01G 9/0525; H01G 9/15
See application file for complete search history.

(56) References Cited

U.S. PATENT DOCUMENTS

| | | | | |
|---|---|---|---|---|
| 3,308,530 A | * | 3/1967 | Irons ..................... | B22F 3/1134 29/423 |
| 3,393,056 A | * | 7/1968 | Zdanuk ................. | C22C 1/0475 428/338 |
| 3,418,106 A | * | 12/1968 | Pierret ..................... | B22F 9/00 419/28 |
| 4,252,868 A | * | 2/1981 | Bohm ..................... | H01M 8/08 29/623.1 |
| 6,215,652 B1 | * | 4/2001 | Yoshida ............... | H01G 9/0032 29/25.03 |
| 6,876,083 B2 | | 4/2005 | Yano et al. | |
| 7,154,743 B2 | | 12/2006 | Takatani et al. | |
| 2003/0104923 A1 | | 6/2003 | Omori et al. | |
| 2004/0016978 A1 | | 1/2004 | Yano et al. | |
| 2009/0296317 A1 | | 12/2009 | Naoi et al. | |

FOREIGN PATENT DOCUMENTS

| | | | |
|---|---|---|---|
| EP | 1547706 A1 | | 6/2005 |
| EP | 2055412 A2 | | 5/2009 |
| JP | 56041301 A | * | 4/1981 |
| JP | 02039417 A | * | 2/1990 |
| JP | 02107741 A | * | 4/1990 |
| JP | 08-162372 A | | 6/1996 |
| JP | 2003-213302 A | | 7/2003 |
| JP | 2003-272959 A | | 9/2003 |
| JP | 2004-349658 A | | 12/2004 |
| WO | 2004/055843 A1 | | 7/2004 |
| WO | 2006057455 A1 | | 6/2006 |
| WO | 2006/132141 A1 | | 12/2006 |

OTHER PUBLICATIONS

Communication dated Aug. 17, 2015 from the European Patent Office in counterpart application No. 12859449.6.

* cited by examiner

*Primary Examiner* — David M Sinclair
(74) *Attorney, Agent, or Firm* — Sughrue Mion, PLLC

(57) ABSTRACT

A capacitor anode including a tungsten sintered body having an average pore diameter of 0.3 μm or less; and a method for producing the anode. The method includes forming tungsten powder into a molded body having a density (Dg) of 8 g/cm³ or more and then sintering the molded body to a density (Ds) of at least 1.15 times the density (Dg) to form a tungsten sintered body having an average pore diameter of 0.3 μm or less.

6 Claims, No Drawings

TUNGSTEN CAPACITOR ANODE AND PROCESS FOR PRODUCTION THEREOF

CROSS REFERENCE TO RELATED APPLICATIONS

This application is a National Stage of International Application No. PCT/JP2012/071941, filed Aug. 30, 2012, claiming priority from Japanese Patent Application No. 2011-276857, filed Dec. 19, 2011, the contents of all of which are incorporated herein by reference in their entirety.

TECHNICAL FIELD

The present invention relates to a capacitor anode comprising a tungsten sintered body and a method for producing the same. Specifically, the present invention relates to a tungsten sintered body having a specific average pore diameter which enables producing an electrolytic capacitor having low equivalent series resistance (ESR) and excellent properties, a method for producing the sintered body, and an electrolytic capacitor using the anode comprising the sintered body.

BACKGROUND ART

With the progress of small-size, high-speed and lightweight electronic devices such as cellular phones and personal computers, the capacitor used for these electronic devices is demanded to have a smaller size, a larger capacitance and a lower ESR.

An electrolytic capacitor composed of a conductor (anode body) as one electrode, a dielectric layer formed on the surface of the electrode, and a counter electrode provided thereon (semiconductor layer).

As an example of such a capacitor, the electrolytic capacitor has been proposed, which capacitor is produced by anodically oxidizing an anode body for capacitors comprising a sintered body made of valve-acting metal powder such as tantalum which can be anodized to form a dielectric layer made of the oxide of the metal in the surface of the anode body.

The electrolytic capacitor using tungsten as a valve-acting metal and employing the sintered body of the tungsten powder as an anode body can attain a larger capacitance compared to the electrolytic capacitor obtained at the same formation voltage by employing the anode body of the same volume using the tantalum powder having the same particle diameter. However, the electrolytic capacitor having the sintered body of the tungsten powder has been unpracticed as an electrolytic capacitor due to the large leakage current (LC). In order to solve this issue, a capacitor using the alloy of tungsten and other metals has been studied and has achieved some improvement in the leakage current, but it was not enough (JP-A-2004-349658 (U.S. Pat. No. 6,876,083); Patent Document 1).

Patent Document 2 (JP-A-2003-272959) discloses a capacitor using an electrode of a tungsten foil selected from $WO_3$, $W_2N$ and $WN_2$ having formed thereon a dielectric layer, but the capacitor is not to solve the above-mentioned leakage current problem.

Also, Patent Document 3 (WO 2004/055843 publication (U.S. Pat. No. 7,154,743)) discloses an electrolytic capacitor using an anode selected from tantalum, niobium, titanium and tungsten, but it does not describe a specific example using tungsten in the specification.

A semiconductor layer as a counter electrode of the electrolytic capacitor having a valve-acting metal sintered body as an anode can generally be composed of an inorganic semiconductor such as manganese dioxide and an organic semiconductor such as a conductive polymer to which a dopant is doped. In order to obtain particularly low ESR, a method of fabricating a semiconductor layer has been implemented by performing polymerization on an anode body having a dielectric layer to form a conductive polymer layer. The above polymerization is conducted by methods such as a chemical polymerization method, an electrolytic polymerization method in which electricity is supplied by an external electrode, an electrolytic polymerization method by way of applying electric current to an anode body, or combination thereof.

Among these, in the electrolytic polymerization method, it has been attempted to form a highly-reproducible and stable conductive polymer layer by electrolytic polymerization in which applied electric current is limited in each anode body having a dielectric layer formed thereon.

PRIOR ART

Patent Document

Patent Document 1: JP-A-2004-349658
Patent Document 2: JP-A-2003-272959
Patent Document 3: WO 2004/055843

DISCLOSURE OF THE INVENTION

Problems to be Solved by the Invention

If pores of the anode body are filled with a semiconductor layer, the path to carry electric charge which is charged deep within the pores to the outer surface of the sintered body becomes shortest, which results in the minimum electric resistance. However, a fine pore tends to be clogged at the inlet of the pore (the inside of the pore tends to be hollow), and only a pore having a certain size can be filled with a semiconductor layer. Therefore, if low ESR is desired, high capacitance cannot be expected, while if high capacitance is desired, low ESR cannot be expected.

Means to Solve the Problem

The present inventors have found that if a tungsten powder sintered body is used as an anode of a capacitor, ESR of the electrode does not decline even if the anode has fine pores. Particularly, they confirmed that even if the average pore diameter of the anode is 0.3 µm or less, the obtained solid electrolytic capacitor has excellent ESR properties, and accomplished the present invention.

That is, the present invention relates to the tungsten sintered body for a capacitor, the method for producing the same, and the electrolytic capacitor using the tungsten sintered body as described below.

[1] A capacitor anode comprising a tungsten sintered body having an average pore diameter of 0.3 µm or less.
[2] A method for producing a capacitor anode by forming tungsten powder into a molded body having a density of 8 g/cm$^3$ or more, sintering the molded body to the density 1.15 times or higher than the above-mentioned density and obtaining a tungsten sintered body having an average pore diameter of 0.3 µm or less.
[3] The method for producing an anode according to [2] above, wherein the tungsten powder having an average particle size of 0.5 μm or less is granulated into granulated powder at a temperature of 1,480° C. or more, and the granulated powder is formed to a molded body having a density of 8 g/cm$^3$ or more.

[4] The method for producing an anode according to [2] or [3] above, using tungsten powder which contains at least one compound selected from tungsten silicide, tungsten nitride, tungsten carbide and tungsten boride in a part of the particle surface.

[5] The method for producing an anode according to [4] above, using tungsten powder which satisfies at least one range of 0.05 to 7 mass % of silicon, 0.01 to 1 mass % of nitrogen, 0.001 to 0.1 mass % of carbon or 0.001 to 0.1 mass % of boron as the content of the element.

[6] The method for producing an anode according to [2] or [3] above, using tungsten powder which contains 1 to 500 ppm by mass of elemental phosphorus.

[7] The method for producing an anode according to [2] or [3] above, using tungsten powder which contains 0.05 to 8 mass % of the oxygen.

[8] The method for producing an anode according to any one of [2] to [7] above, wherein the tungsten sintered body is sintered so as to have a density of 9.2 to 14 g/cm$^3$.

[9] An electrolytic capacitor composed of the anode according to [1] above as one electrode and a dielectric body interposed between the electrode and a counter electrode.

Effects of the Invention

The electrolytic capacitor in which the tungsten sintered body of the present invention having an average pore diameter of 0.3 μm or less is used as an anode shows good ESR properties while having high capacitance, compared to the conventional tantalum capacitor and the like.

MODE FOR CARRYING OUT THE INVENTION

The tungsten powder as a material for a tungsten sintered body (i.e. unprocessed tungsten powder, may be referred to as "primary powder" hereinafter) used in the present invention is commercially available, in which the lower limit of the average particle size is 0.5 μm. The smaller the particle diameter of tungsten powder is, a sintered body (anode) having smaller pores can be produced. The tungsten powder having a still smaller particle diameter than those of commercially available tungsten powder can be obtained by, for example, pulverizing the tungsten trioxide powder under hydrogen atmosphere; or reducing the tungsten acid and halogenated tungsten using a reducing agent such as hydrogen and sodium and appropriately selecting the reducing conditions.

Also, the tungsten powder can be obtained by reducing the tungsten-containing mineral directly or through several steps and by selecting the reducing conditions.

The tungsten powder as a material of the present invention may be granulated (the granulated tungsten powder may be simply referred to as "granulated powder" hereinafter). Granulated powder is preferable due to its good flowability and workability for molding and the like.

Pore distribution of the above mentioned granulated powder may be adjusted in the manner as JP-A-2003-213302 (WO 02/092864) discloses with respect to the niobium powder.

The granulated powder can also be obtained, for example, by adding at least one liquid such as water and liquid resin to the primary powder so as to be made into the granules having an appropriate size; and sintering the granules by heating under reduced pressure. The reduced-pressure condition to obtain easy-to-use granulated granules (e.g. under non-oxidizing gas atmosphere such as hydrogen at 10 kPa or less) and the condition for allowing the granules to stand at a high temperature (e.g. 1,100° C. to 2,600° C., 0.1 hour to 100 hours) can be determined by a preliminary experiment. If there are no agglomerations of the granules with each other after the sintering, there is no need for pulverization.

Such a granulated powder can be classified by a sieve to make each particle have a similar diameter. The average particle size within a range of preferably 50 to 200 μm, more preferably 100 to 200 μm, is favorable because the powder can smoothly flow from the hopper of the molding equipment to a mold.

The primary powder having an average particle diameter of 0.1 to 1 μm, preferably 0.1 to 0.3 μm can increase the capacitance of the electrolytic capacitor particularly, when the capacitor is produced from the granulated powder thereof.

When obtaining such a granulated powder, it is favorable to make the granulated powder so as to have a specific surface area (by BET method) of preferably 0.2 to 20 m$^2$/g, more preferably 1.5 to 20 m$^2$/g, by controlling the above-mentioned primary particle diameter because it can further increase the capacitance of the electrolytic capacitor.

The tungsten materials (including primary powder, granulated powder and a sintered body) of the present invention may include several impurities described as below in order to improve leakage current characteristics and the like of the obtained capacitor.

For example, preferably used is tungsten powder in which a part of its surface is tungsten silicide so that the silicon content falls within a specific range. The tungsten powder in which a part of its surface is tungsten silicide is prepared by mixing 0.05 to 7 mass % of silicon powder to tungsten powder, heating under reduced pressure and allowing the mixture to react at temperature from 1,100 to 2,600° C.; or pulverizing tungsten in hydrogen stream, further mixing silicon powder, heating under reduced pressure and allowing the mixture to react at temperature from 1,100 to 2,600° C.

Tungsten powder in which a part of the particle surface further contains at least one compound selected from tungsten nitride, tungsten carbide and tungsten boride can be suitably used.

As an example of the method for nitriding a part of the surface of each tungsten powder, there is a method of placing the tungsten powder at 350 to 1,500° C. under reduced pressure and allowing the nitrogen gas to pass through the powder for from several minutes to several hours. The nitridation may be performed at the time of high temperature treatment to silicify the tungsten powder, or the nitridation may be performed prior to the silicification. Furthermore, the nitridation may be performed in the stage of the primary powder, after producing the granulated powder, or after producing the sintered body. Thus, the timing of the nitridation is not specified but it is preferable to make the tungsten powder to have a nitrogen content of 0.01 to 1 mass % in an early stage of the production process. By the nitridation, excessive oxidation of the powder can be prevented when the powder is handled in air.

In the above-mentioned nitrogen content, not only the nitrogen bonded to tungsten but also the nitrogen having no chemical bond with tungsten (e.g. nitrogen solute in a solid solution) is included.

As an example of the method for carbonizing a part of the surface of each tungsten powder, there is a method of placing the tungsten powder at 300 to 1,500° C. under reduced pressure in a high temperature vacuum furnace using carbon electrodes for from several minutes to several hours. It is desirable to perform the carbonization so as to make the carbon content to 0.001 to 0.5 mass % by selecting the temperature and period of time. The timing of the carbonization is the same as mentioned in the timing of the nitridation. When the nitrogen is allowed to pass in the furnace using carbon electrodes under predetermined conditions, the carbonization and the nitridation occur simultaneously, which enables the production of the tungsten powder in which a part of the surface is nitrided and carbonized.

As an example of the method for boronizing a part of the surface of the tungsten powder, there is a method of placing the boron element or a boron-containing compound as a boron source when granulating the tungsten powder. It is preferable to boronize the powder so as to have the boron content of 0.001 to 0.1 mass %. The timing of the boronization is the same as mentioned in the timing of the nitridation. When powder is granulated by placing the nitrided tungsten powder with a boron source in a furnace using carbon electrodes, it is possible to produce a tungsten powder in which a part of the surface is silicified, nitrided, carbonized and boronized.

The oxygen content of the tungsten powder of the present invention is preferably 0.05 to 8 mass %, and more preferably 0.08 to 1 mass %.

As a method for controlling the oxygen content to 0.05 to 8 mass %, there is a method of oxidizing the surface of the tungsten powder in which at least a part of the surface is silicified and further subjected to at least one of nitridation, carbonization and boronization. Specifically, nitrogen gas containing oxygen is introduced at the time of taking out the powder from a high temperature vacuum furnace at the time of producing a primary powder or a granulated powder of each powder. In this case, if the temperature at the time of taking out from the high temperature vacuum furnace is lower than 280° C., oxidation takes priority over nitridation. By feeding the gas gradually, a predetermined oxygen content can be obtained. By making each of the tungsten powders have a predetermined oxygen content in advance, it is possible to reduce the deterioration due to the irregular excessive oxidation during the subsequent processes for producing anode for electrolytic capacitors using the powder. In the case when the nitridation is not performed in this process, an inert gas such as argon and helium may be used instead of the nitrogen gas.

The phosphorous content of the tungsten powder of the present invention is preferably from 1 to 500 ppm by mass.

As an example of the methods for incorporating the phosphorous element in an amount of 1 to 500 ppm by mass in the tungsten powder or that which was further subjected to at least one of nitridation, carbonization, boronization or oxidization, there is a method of producing the phosphorous-containing powder by placing phosphorous or a phosphorous compound as a phosphorous source in the high temperature vacuum furnace at the time of producing a primary powder or a granulated powder of each tungsten powder. It is desirable to incorporate phosphorous in the tungsten powder so as to make the phosphorous content within the above-mentioned range by controlling the amount of the phosphorous source and the like because the physical breakdown strength of the anode bodies produced thereof can be improved in some cases.

In the present invention, the above-mentioned tungsten powder is molded into a molded body having a density (Dg) of 8 g/cm$^3$ or more. The molded body is sintered to have a density (Ds) of 1.15 or higher than the above-mentioned density (Dg), to be a sintered body having an average pore diameter of 0.3 µm or less, preferably 0.1 to 0.3 µm.

Specifically, a tungsten sintered body having an average pore diameter of 0.1 to 0.3 µm is obtained, for example, as below: Primary powder having an average particle diameter of 0.5 µm or less is used as tungsten powder, and the powder is heat-granulated at a temperature of 1,480° C. or more to be granulated powder (preferably having an average particle diameter of 50 to 200 µm). A predetermined mass of the powder is placed in a mold, the powder is molded by pressing a pair of opposing faces of the mold to obtain a molded body having a density (Dg) of 8 g/cm$^3$ or more, and the molded body is sintered. The capacitor anode of the present invention can be produced by sintering the molded body so that the sintered body has a density (Ds) of 1.15 times or higher than the density (Dg) of the molded body. For the anode of the capacitor having further high capacitance, the molded body may be sintered so that the density of the sintered body (Ds) is preferably 9.2 to 14 g/cm$^3$ and more preferably 9.2 to 11 g/cm$^3$. The density of the sintered body can be increased by sintering at a higher temperature or for a longer period of time, and can be decreased by sintering at a lower temperature or for a shorter period of time. The sintering temperature and the time also depend on contained impurities. Therefore, it is desirable to determine the temperature and the time by a preliminary experiment. Generally, they are in the range of 1,480 to 2,600° C. and 10 minutes to 100 hours, respectively.

The average pore diameter decreases by increasing the density of the sintered body (Ds) or using primary powder having a smaller average particle size. On the contrary, the average pore diameter increases by decreasing the density of the sintered body (Ds) or using primary powder having a larger average particle size. The average pore diameter can be adjusted in the above range by a preliminary experiment.

In the present invention, an electrolytic capacitor is fabricated using the sintered body manufactured by the above method as an electrode (anode) and a dielectric layer interposed between the electrode and a counter electrode (cathode).

EXAMPLES

The present invention is described below by referring to Examples and Comparative Examples, but the present invention is not limited thereto.

[Measuring Instruments and Measuring Conditions]

Particle diameter, pore distribution, capacitance and ESR were measured by the following methods.

The particle diameter was measured using HRA9320-X100 manufactured by Microtrac Inc. and the particle size distribution was measured by the laser diffraction scattering method. A particle size value ($D_{50}$; µm) corresponding to cumulative volume % of 50 volume % was designated as the average particle size. Since a primary powder generally has good dispersibility, the average particle diameter of the secondary powder measured by the above measuring method can be regarded almost as an average primary particle diameter.

Pore distribution was measured by NOVA2200E (manufactured by SYSMEX Corp.) A pore diameter corresponding to cumulative volume % of 50 volume % was designated as the average pore diameter.

Capacitance and ESR were measured using LCR meter manufactured by Agilent Technologies, Inc. The capacitance is a value at room temperature, 120 Hz, bias 2.5 V, and ESR is a value at room temperature, 100 kHz.

Examples 1 to 12, Comparative Examples 1 to 9

Production of Sintered Body

Tungsten primary powder having an average particle diameter each shown in Table 1 was obtained by controlling hydrogen concentration at the time of reducing tungsten oxide powder. Each primary powder was divided in several groups, and silicon powder having an average particle diameter of 1 μm was mixed into 500 g of each primary powder so that the silicon content was 0.5 mass %. Then the powder was left to stand for 30 minutes under the reduced pressure of $10^{-2}$ Pa at the granulation temperature also shown in Table 1. Subsequently, the powder was cooled to room temperature, pulverized with a hammer mill and classified to thereby obtain a tungsten granulated powder having an average particle diameter of 20 to 180 μm. Each granulated powder was further divided into several groups, and about 20,000 pieces of molded bodies in a size of 1.05×1.65×4.63 mm (on which an 8.0-millimeter-long lead wire is planted on the 1.05×1.65 plane) having a molding density (Dg) also shown in Table 1, were produced using TAP-2R molding apparatus manufactured by Seiken Co, Ltd. and a tantalum wire of 0.29 mm in diameter. Next, the molded bodies were divided in several groups and sintered under reduced pressure of $10^{-2}$ Pa for 30 minutes to thereby obtain 200 pieces per each Example or Comparative Example of the sintered bodies having density (Ds) shown in Table 1 in which the Ds/Dg value is also described. Please note that the density of the sintered body (Ds) was adjusted by sintering temperature (1,500° C. or higher). Table 1 also shows average pore diameters of the manufactured sintered bodies in each Example and Comparative Example.

[Production of Solid Electrolytic Capacitor]

The sintered bodies of each Example and Comparative Example were subjected to chemical conversion and electrolytic polymerization using a jig recited in Example 1 in WO 2010/107011 publication (US 2012/014036 A1). As the chemical conversion, the sintered body was immersed in 0.1 mass % of nitric acid aqueous solution at room temperature for 10 hours, and 10 V of voltage was applied thereto for 10 hours. After being washed with water, the sintered body was washed with ethanol and dried to thereby form a dielectric layer. A semiconductor layer comprising conductive polymer was formed by electrolytic polymerization as below: The treatment of immersing the chemically-conversed sintered body in 3 mass % of iron toluenesulfonic acid aqueous solution followed by drying was conducted five times, and the resultant was left to stand for one day. Subsequently, the sintered body was immersed in 20 mass % of ethylenedioxythiophene ethanol solution. Then, the chemically-conversed sintered body was immersed to a predetermined depth in a stainless steel (SUS303) container containing separately prepared electrolytic polymerization liquid (solution of 30 parts by mass of water and 70 parts by mass of ethylene glycol, including 0.4 mass % of ethylenedioxythiophene and 0.6 mass % of anthraquinone sulfonic acid), and electrolytic polymerization was conducted at 20° C., 10 μA for 45 minutes. After taken out from the liquid, the sintered body was washed with water, washed with ethanol and dried. Further, post chemical conversion was conducted in the above-mentioned chemical conversion liquid at room temperature for 15 minutes, followed by washing with water, washing with ethanol and drying. The step of immersing in 20 mass % of ethylenedioxythiophene ethanol solution, electrolytic polymerization and post chemical conversion as mentioned above was repeated another nine times (total 10 times). The current value of the electrolytic polymerization was adjusted to 10 μA at the second time, 30 μA at the third time and 50 μA at the fourth to tenth times. On a predetermined part of the semiconductor layer formed as above, carbon layer and silver paste layer were sequentially laminated to form an electrode layer, and a capacitor element was produced. The two capacitor elements in which anode lead wires have been cut to a predetermined length were placed in the same direction without space on a frame for terminals made of copper alloy C151SH manufactured by Hitachi Cable, Ltd. (0.1 mm in thickness and 5 μm-thick tin is plated on the surface of the frame) and connected to the frame by known methods, sealed by transfer molding using the resin CV3400SE manufactured by Matsushita Electric Works Co, Ltd. (present name: Panasonic Electric Works Co., Ltd.), cured at 150° C. for five hours and aged at 125° C. and 3V for 20 hours to thereby obtain a chip-shape solid electrolytic capacitor in a size of 7.3×4.3×1.9 mm. Among the capacitors obtained in Examples and Comparative Examples, 64 pieces were randomly selected and the capacitance (μF) and ESR (mΩ) were measured. The results (average value of 64 pieces) were shown in Table 2.

TABLE 1

|  | Average particle diameter D50 of primary powder (μm) | Granulation temperature (° C.) | Dg (g/cm³) | Ds (g/cm³) | Ds/Dg | Average pore diameter (μm) |
| --- | --- | --- | --- | --- | --- | --- |
| Example 1 | 0.5 | 1480 | 8.0 | 9.2 | 1.15 | 0.30 |
| Example 2 | 0.5 | 1480 | 8.0 | 10.0 | 1.25 | 0.29 |
| Example 3 | 0.5 | 1520 | 8.3 | 9.6 | 1.16 | 0.29 |
| Example 4 | 0.5 | 1520 | 8.3 | 10.4 | 1.25 | 0.28 |
| Example 5 | 0.4 | 1480 | 8.0 | 9.2 | 1.15 | 0.27 |
| Example 6 | 0.4 | 1480 | 8.0 | 10.0 | 1.25 | 0.26 |
| Example 7 | 0.4 | 1510 | 8.2 | 9.5 | 1.16 | 0.25 |
| Example 8 | 0.4 | 1510 | 8.2 | 10.3 | 1.26 | 0.24 |
| Example 9 | 0.3 | 1480 | 8.0 | 9.2 | 1.15 | 0.23 |
| Example 10 | 0.3 | 1480 | 8.0 | 9.6 | 1.20 | 0.22 |
| Example 11 | 0.3 | 1500 | 8.2 | 9.5 | 1.16 | 0.21 |
| Example 12 | 0.3 | 1500 | 8.2 | 9.8 | 1.20 | 0.20 |
| Comparative Ex. 1 | 0.6 | 1480 | 8.0 | 9.2 | 1.15 | 0.38 |
| Comparative Ex. 2 | 0.6 | 1480 | 8.2 | 10.3 | 1.26 | 0.36 |
| Comparative Ex. 3 | 0.5 | 1450 | 8.0 | 9.2 | 1.15 | 0.35 |
| Comparative Ex. 4 | 0.5 | 1450 | 8.2 | 9.4 | 1.25 | 0.33 |
| Comparative Ex. 5 | 0.4 | 1510 | 7.7 | 8.9 | 1.16 | 0.34 |

TABLE 1-continued

|  | Average particle diameter D50 of primary powder (μm) | Granulation temperature (° C.) | Dg (g/cm³) | Ds (g/cm³) | Ds/Dg | Average pore diameter (μm) |
|---|---|---|---|---|---|---|
| Comparative Ex. 6 | 0.4 | 1510 | 7.7 | 9.6 | 1.25 | 0.32 |
| Comparative Ex. 7 | 0.3 | 1450 | 7.7 | 8.9 | 1.15 | 0.33 |
| Comparative Ex. 8 | 0.3 | 1450 | 7.7 | 9.2 | 1.19 | 0.32 |
| Comparative Ex. 9 | 0.3 | 1480 | 7.8 | 8.8 | 1.13 | 0.35 |

TABLE 2

|  | Capacitance (μF) | ESR (mΩ) |
|---|---|---|
| Example 1 | 923 | 8.4 |
| Example 2 | 915 | 8.2 |
| Example 3 | 930 | 8.0 |
| Example 4 | 937 | 6.6 |
| Example 5 | 1135 | 5.7 |
| Example 6 | 1152 | 5.5 |
| Example 7 | 1205 | 5.5 |
| Example 8 | 1216 | 5.3 |
| Example 9 | 1432 | 5.2 |
| Example 10 | 1420 | 5.2 |
| Example 11 | 1446 | 4.9 |
| Example 12 | 1455 | 4.2 |
| Comparative Example 1 | 724 | 14.3 |
| Comparative Example 2 | 775 | 14.6 |
| Comparative Example 3 | 947 | 14.4 |
| Comparative Example 4 | 933 | 14.0 |
| Comparative Example 5 | 1028 | 13.7 |
| Comparative Example 6 | 1035 | 13.6 |
| Comparative Example 7 | 1375 | 13.2 |
| Comparative Example 8 | 1382 | 12.4 |
| Comparative Example 9 | 1388 | 12.1 |

Reference Examples 1 to 3

Three kinds of tantalum primary powder having an average particle diameter of 0.5 μm, 0.3 μm and 0.2 μm, respectively, were produced by controlling sodium concentration at the time of reducing potassium tantalate fluoride. Then three kinds of granulated powder were produced in a similar manner to Example 1 except that the temperature was set at 1,320° C. From these powder, molded bodies having the molding density of 5.6 g/cm³ were obtained in a similar manner to Examples. Further, the molded bodies were sintered at a temperature of 1,355° C. or more to obtain sintered bodies having an average pore diameter shown in Table 3. Subsequently, a chip-shape tantalum solid electrolytic capacitor was produced in a similar manner to Example 1 except that the chemical conversion was conducted with phosphoric acid aqueous solution at 65° C. and the post-polymerization chemical conversion was conducted with phosphoric acid aqueous solution at 65° C. Table 3 shows average values of 64 pieces of capacitors produced in each Reference Example.

TABLE 3

|  | Average pore diameter of sintered body (μm) | Capacitance of capacitor (μF) | Capacitor ESR (mΩ) |
|---|---|---|---|
| Reference Example 1 | 0.31 | 330 | 4.8 |
| Reference Example 2 | 0.25 | 470 | 5.7 |
| Reference Example 3 | 0.20 | 680 | 6.4 |

Comparison between Tables 1, 2 and 3 revealed the followings. When the capacitor made of tantalum sintered body is used as an anode body, the smaller the average pore diameter is, the larger the capacitance is, but ESR increases. In contrast, when the capacitor made of the tungsten sintered body of the present invention is used as an anode, ESR is low even in the case of small average pore diameter and large capacitance. Further, the capacitance of the electrolytic capacitor using the tungsten sintered body of the present invention is much larger than the capacitance of the capacitor using the tantalum sintered body.

The invention claimed is:

1. A method for producing a capacitor anode by forming tungsten powder into a molded body having a molded density of 8 g/cm³ or more, sintering the molded body to have a sintered density 1.15 times or higher than the molded density and obtaining a tungsten sintered body having an average pore diameter of 0.3 μm or less,
  wherein the tungsten powder has an average particle size of 0.5 μm or less, and the tungsten powder having an average particle size of 0.5 μm or less is granulated into granulated powder at a temperature of 1,480° C. or more, and the granulated powder is formed to the molded body having a molded density of 8 g/cm³ or more.

2. The method for producing an anode according to claim 1, using tungsten powder which contains at least one compound selected from tungsten silicide, tungsten nitride, tungsten carbide and tungsten boride in a part of the particle surface.

3. The method for producing an anode according to claim 2, using tungsten powder which satisfies at least one range of 0.05 to 7 mass % of silicon, 0.01 to 1 mass % of nitrogen, 0.001 to 0.1 mass % of carbon or 0.001 to 0.1 mass % of boron as the content of the element.

4. The method for producing an anode according to claim 1, using tungsten powder which contains 1 to 500 ppm by mass of elemental phosphorus.

5. The method for producing an anode according to claim 1, using tungsten powder which contains 0.05 to 8 mass % of the oxygen.

6. The method for producing an anode according to claim 1, wherein the tungsten sintered body is sintered so as to have a sintered density of 9.2 to 14 g/cm³.

* * * * *

UNITED STATES PATENT AND TRADEMARK OFFICE
CERTIFICATE OF CORRECTION

PATENT NO. : 9,478,360 B2
APPLICATION NO. : 14/366577
DATED : October 25, 2016
INVENTOR(S) : Kazumi Naito It is certified that error appears in the above-identified patent and that said Letters Patent is hereby corrected as shown below:

On the Title Page

Item (73), change "SHOW A" to --SHOWA--.

Signed and Sealed this
Fourth Day of April, 2017

Michelle K. Lee
*Director of the United States Patent and Trademark Office*